March 28, 1961 E. J. NICHOLL 2,977,072
AIRCRAFT UNDERCARRIAGE
Filed June 18, 1958

INVENTOR
Edward J. Nicholl
By Reynolds, Beach & Christensen
ATTORNEYS

United States Patent Office 2,977,072
Patented Mar. 28, 1961

2,977,072

AIRCRAFT UNDERCARRIAGE

Edward James Nicholl, Charlton Kings, Cheltenham, England, assignor to Dowty Rotol Limited, London, England Filed June 18, 1958, Ser. No. 742,794

Claims priority, application Great Britain June 21, 1957

3 Claims. (Cl. 244—103)

This invention relates to aircraft undercarriages which incorporate one or more liquid springs as shock absorbers. A practical difficulty involved with liquid springs is the variation of volume of liquid in the pressure chamber with variation in temperature. Within the extremes of atmospheric temperature met with by an aircraft there would be a considerable change in length of a liquid spring if the quantity of liquid enclosed were constant. It is impossible to select a liquid having a low temperature coefficient of expansion since the compressibility would then be too low because of the fact that for all liquids the ratio of compressibility to temperature coefficient of expansion is substantially constant.

It has previously been proposed to overcome this difficulty by connecting the liquid spring chamber permanently to a source of hydraulic liquid at a predetermined pressure in the aircraft through a surge valve which is spring-loaded to an open position to allow slow flow of liquid in either direction but closing under a rush of liquid from the pressure chamber. However, in certain circumstances this arrangement is not satisfactory. For example when the aircraft lands in a cold state and is allowed to warm up to a considerably higher ground temperature, the liquid may fully extend so that even when the load is taken from the spring the surge valve will not open, the spring in effect remaining hard under a pre-load pressure exceeding that of the source, until the temperature of the spring is reduced. Further, in normal temperature conditions, if the aircraft is not loaded the lighter weight on the liquid spring might not be sufficient to close the surge valve thus allowing slow escape of liquid and collapse of the liquid spring.

The present invention has for its object to provide an alternative solution to overcome the difficulties above-mentioned.

The invention broadly comprises the provision in an aircraft undercarriage component having a liquid spring shock absorber, an isolating valve in a connection from a hydraulic pressure source in the aircraft to the liquid spring chamber, and operating means for positively opening this valve on extension of the undercarriage component beyond a predetermined extent, and closing the valve upon contraction of the component from said predetermined extent. Thereby, the liquid spring always retains and isolates hydraulic fluid at an adequate pressure, and should its pressure tend to become excessive for any reason it is assured that an automatic limitation on pressure build-up will occur.

The invention is illustrated in the accompanying drawings, of which:

Figure 2:
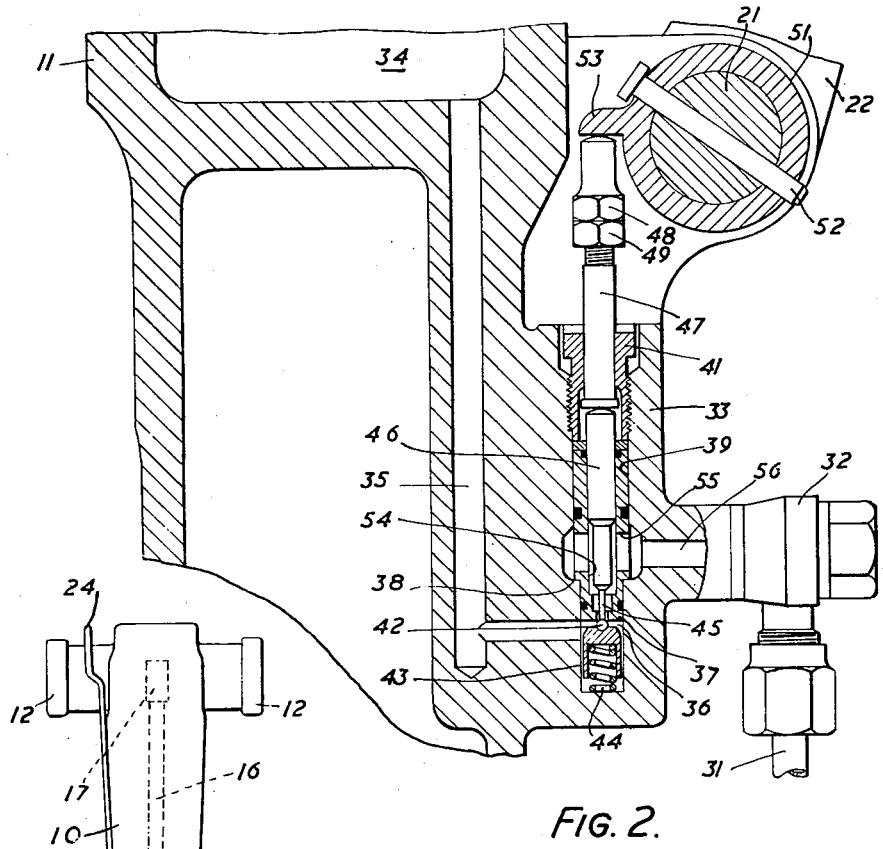
Figure 2 is a sectional view on an enlarged scale of the central part of the component shown in Figure 1.
Figure 1:
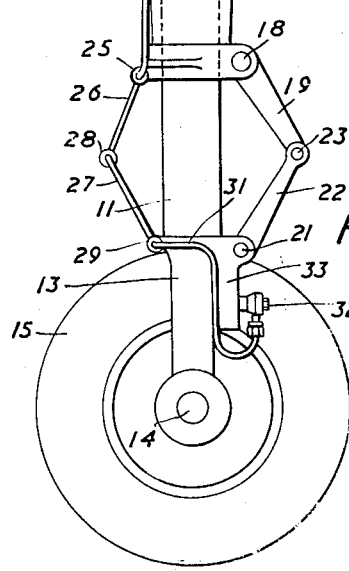
Figure 1 is a side elevation of a retractable undercarriage component.

The invention is shown applied to a main undercarriage component or leg having an upper part formed as a tubular guide 10 for a cylindrical lower part 11 which is slidably mounted therein. The tubular guide is provided with trunnion bearings 12 for mounting on the aircraft, while the lower end of the cylindrical part is provided with forked arms 13 which carry an axle 14 for the landing wheel 15. The cylindrical part 11 forms the pressure cylinder of a liquid spring into which a plunger 16 enters in slidable sealing relation, under applied loading, the upper end portion 17 of the plunger being fixed in the head of the tubular guide 10 whereby the plunger 16 will move in and out of the cylinder 11 as the latter slides up and down respectively in the tubular guide.

The tubular guide 10 carries at its lower end a pivot 18 for an upper torque link 19 while the cylinder 11 carries a pivot 21 for a lower torque link 22, the links 19 and 22 having a common pivot 23 and acting in known manner to prevent relative rotation of the upper and lower leg parts. A pressure pipe 24 adapted for connection with a source of predetermined pressure in the hydraulic system of the aircraft extends down the tubular guide 10 to a swivel joint 25 and thence through two connecting pipes 26 and 27 articulated at the swivel joint 28, to a lower swivel joint 29 fixed on the cylinder 11. A pipe 31 extends from the swivel joint 29 to the inlet connection 32 of a block 33 for an isolating valve which is shown for simplicity as being an integral part of the cylinder 11. It may, nevertheless, be a separate component rigidly attached thereto.

Turning to the enlarged view of Figure 2, the cylinder 11 contains a liquid spring pressure chamber 34 communicating through a passage 35 with a bore 36 formed in the lower end of the valve block 33. The bore contains a valve seating member 37 located by a shoulder 38 against the mouth of the bore 36, while an enlarged portion of the seating member 37 above the shoulder 38 fits within an enlarged bore 39 and is held down by a screw-threaded plug 41. The valve seating member 37 provides at its lower end a fixed seat for a ball isolating valve 42 which is normally retained thereon by a thimble 43 subject to the action of a valve closing spring 44.

The ball valve 42 can be lifted off its seat by the reduced lower end 45 of a pin 46 which is slidably mounted in the upper part of the valve seating member 37. An actuating plunger 47 for the pin 46 is slidably mounted in the plug 41 while its upper end carries an adjuster nut 48 and a lock nut 49. The pivot 21 of the lower torque link 22 carries a collar 51 which is secured thereto by a pin 52 so that the collar 51 will turn in unison with the pivot pin 21 and the lower torque link 22 as the undercarriage component extends and contracts under varying load. A radial projection 53 on the collar 51 extends over the adjuster nut 48 of the actuating plunger 47 to engage same when the pivot pin 21 turns into a given position corresponding to a predetermined relationship between the upper and lower leg parts 10 and 11 close to their maximum relative extension. Upon full extension the torque links 19, 22 tend to straighten and turn the collar 51 anti-clockwise, whereby the projection 53 operates through the plunger 47 and pin 46 to lift the ball valve 42 off its seat.

The bore 54 of the seating member 37 opens through a transverse hole 55 into a passage 56 which connects through the inlet connection 32 with the pressure fluid supply pipe 31.

The ball valve 42 is in fact arranged as a non-return valve which opens under excess pressure in the pipe 31 from the liquid pressure source, to admit pressure fluid to chamber 34, but closes under excess pressure in the pressure chamber 34 of the liquid spring.

It will be seen that whenever the undercarriage leg extends beyond a predetermined limit close to maximum extension, the lower torque link 22 will open the isolating valve 42 and connect the pressure chamber 34 of the liquid spring to the pressure source of the aircraft hydraulic system. The normal occasion on which this extension will occur is when the aircraft weight is taken off the leg and it will be seen that the whole of the time the aircraft is airborne, the interior of the spring is connected to the aircraft hydraulic supply. In fact until the instant when the aircraft touches ground during landing the liquid spring is connected to the aircraft hydraulic system whereby as weight comes on to the undercarriage during landing the liquid spring may be said to be primed. It is thus assured that the liquid-spring shock absorber is correctly pre-loaded at the pressure of the hydraulic system at the moment of landing, so that it can operate at its designed efficiency. If it so happens that after the aircraft has landed the temperature rises and the liquid in the liquid spring expands, then extension of the liquid spring can only take place to the extent that the isolating valve 42 is opened by the straightening of the torque links 19 and 22 as described to vent the excess liquid back into the aircraft hydraulic system.

Thus, although the ball valve 42 closes under pressure in the liquid spring, it will in effect act in conjunction with the valve-operating mechanism 53, 47 and 46 as a relief valve to prevent excessive pressure building up in the liquid spring.

I claim as my invention:

1. An aircraft undercarriage component comprising an upper leg part adapted for fixing to the aircraft, a wheel-carrying lower leg part connected with the upper leg part for guided movement relative thereto, a liquid spring shock absorber including a pressure chamber and operatively interposed between the upper and lower leg parts to resist their approach under normal ground loads through a normal range of operation, and to effect their separation beyond such normal range by its internal pressure when the aircraft is airborne and the pressure chamber is unloaded, a conduit leading from said pressure chamber for connection with a liquid pressure source external to the undercarriage component and of a pressure value less than that within the pressure chamber while the leg parts parts are operating in such normal range, an isolating valve interposed in said conduit, and including a self-closing non-return valve element arranged to close under a pressure in the pressure chamber exceeding the source pressure, and valve-operating means including a plunger operatively connected to a leg part and arranged for movement therewith to engage and unseat said valve element upon relative extension of the upper and lower leg parts beyond such normal range, and to disengage said valve element to enable its reseating upon approach of the leg parts into such normal range.

2. An aircraft undercarriage component comprising an upper leg part adapted for fixing to the aircraft, a wheel-carrying lower leg part mounted telescopically in the upper leg part, torque linkage pivotally interposed between the upper and lower leg parts to permit telescoping movement without relative rotation, a liquid spring pressure chamber formed within the lower leg part and having a co-operable plunger fixed to the upper leg part, a conduit leading from a liquid pressure source externally of the leg to the pressure chamber of the liquid spring, an isolating valve fixed with respect to the lower leg part and being interposed in said conduit, a valve-operating plunger extending from the valve, and a plunger-engaging projection fixedly associated with one of the torque links, said projection being movable upon relative extension of the upper and lower leg parts beyond a predetermined extent to open the isolating valve and so place the pressure chamber in communication with the pressure source.

3. An aircraft undercarriage component comprising an upper leg part adapted for fixing to the aircraft, a wheel-carrying lower leg part connected with the upper leg part for guided movement relative thereto during ground-borne and airborne movement, a liquid spring shock absorber including a pressure chamber and operatively interposed between the upper and lower leg parts to resist their approach under normal ground loads through a normal range of operation, and to effect their separation beyond such normal range by its internal pressure when the aircraft is airborne and the pressure chamber is unloaded, a conduit leading from said pressure chamber for connection with an external liquid pressure source of a pressure value less than that which obtains within the pressure chamber while the leg parts are operating within the normal range, normally closed valve means interposed in said conduit, and means operatively connected to a leg part and arranged to open said valve means by separational movement of the leg parts beyond their normal range, as when the aircraft is airborne, and to enable closing of said valve means upon approach of the leg parts into such normal range, as when ground borne.

References Cited in the file of this patent
UNITED STATES PATENTS

| | | |
|---|---|---|
| 1,371,648 | Schmidt | Mar. 15, 1921 |
| 2,390,334 | Snarey | Dec. 4, 1945 |

FOREIGN PATENTS

| | | |
|---|---|---|
| 533,431 | Great Britain | Feb. 13, 1941 |